US009467548B1

(12) United States Patent
Allore et al.

(10) Patent No.: US 9,467,548 B1
(45) Date of Patent: Oct. 11, 2016

(54) RF TRANSMISSION IN A MODULAR PORTABLE ELECTRONIC DEVICE

(71) Applicant: Motorola Mobility LLC, Chicago, IL (US)

(72) Inventors: Joseph L Allore, Mundelein, IL (US); Mohammed Abdul-Gaffoor, Palatine, IL (US); Paul Fordham, Wauconda, IL (US); Michael J Lombardi, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/721,295

(22) Filed: May 26, 2015

(51) Int. Cl.
*H04B 1/38* (2015.01)
*H04M 1/725* (2006.01)
*H04B 1/3827* (2015.01)
*H04W 88/02* (2009.01)

(52) U.S. Cl.
CPC ....... *H04M 1/72527* (2013.01); *H04B 1/3833* (2013.01); *H04W 88/02* (2013.01)

(58) Field of Classification Search
CPC ........... H04W 88/02; H04M 1/72519; H04M 1/0214; H01R 9/2408
USPC .................. 455/557, 550.1, 575.1; 439/717
See application file for complete search history.

(56) References Cited

U.S. PATENT DOCUMENTS

| | | | | |
|---|---|---|---|---|
| 3,750,093 A | * | 7/1973 | Debaigt | H01R 13/428 439/591 |
| 7,442,056 B1 | * | 10/2008 | Ju | H01R 12/716 439/540.1 |
| 2003/0040779 A1 | * | 2/2003 | Engmark | A61N 1/3754 607/36 |
| 2003/0231093 A1 | * | 12/2003 | Hsu | H01F 17/0006 336/200 |
| 2006/0262476 A1 | * | 11/2006 | Su | B60R 16/03 361/118 |
| 2007/0082509 A1 | * | 4/2007 | Kuo | H01R 29/00 439/45 |
| 2015/0130497 A1 | * | 5/2015 | Kim | G01R 1/0466 324/756.02 |

* cited by examiner

*Primary Examiner* — Danh Le

(57) ABSTRACT

A modular portable device interconnection system includes a magnetic attachment point on a first portable device and a corresponding magnetically responsive attachment point on a second portable device. The magnetic attachment point includes a plated annular magnet, an electrically conductive pin extending through the magnet and an electrically insulating layer insulating the electrically conductive pin from the magnet. The magnetically responsive attachment point includes a ferromagnetic annulus, plated or otherwise conductive, configured and located to mate with the annular magnet when the first and second devices are placed together. In this configuration, the electrically conductive pin and electrically insulating layer extend through both the magnet and the ferromagnetic annulus, forming a shielded electrically conductive pathway between the devices. This pathway is suitable for RF signals but may also be used for other AC signals or DC signals.

19 Claims, 6 Drawing Sheets

RF TRANSMISSION IN A MODULAR PORTABLE ELECTRONIC DEVICE

TECHNICAL FIELD

The present disclosure is related generally to modular mobile communication devices, and, more particularly, to a system and method for transmission of RF signals in a modular portable communication device.

BACKGROUND

Modern smartphones offer a vast array of features and functions. Indeed, modern smartphones are so capable that, for the first time in history, the number of online searches executed from mobile devices now exceeds the number of searches executed from personal computers and laptops. Nonetheless, not every user needs every function. For example, a user who is not interested in photography does not need an enhanced camera function, and a user who is not interested in audio entertainment does not need an enhanced sound system. Moreover, there is still an ongoing effort to reduce the thickness and weight of devices.

To this end, the inventors have devised a modular system, wherein separate dockable modules provide enhanced functionality to a base device. This system provides a compact base device that supports extended functionality when needed. Within such a modular system, a majority of antenna activity occurs in the base device, with little to no antenna activity in the added module. At the moment this remains the case, since it is difficult to transfer radio frequency (RF) signals between the base device and the added module without significant loss of signal integrity.

While the present disclosure is directed to a system that can eliminate certain shortcomings noted in this Background section, it should be appreciated that such a benefit is neither a limitation on the scope of the disclosed principles nor of the attached claims, except to the extent expressly noted in the claims. Additionally, the discussion of technology in this Background section is reflective of the inventors' own observations, considerations, and thoughts, and is in no way intended to accurately catalog or comprehensively summarize any item of prior art.

As such, the inventors expressly disclaim this section as admitted or assumed prior art with respect to the discussed details. Moreover, the identification herein of a desirable course of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a comprehensive discussion of the disclosed principles, an overview is given to aid the reader in understanding the later discussion. As noted above, in a modular device system, it is difficult to transfer RF signals between the base device and the function-extending module without negatively impacting signal integrity. However, the inventors have derived a solution specifically applicable to modular systems, wherein, in an embodiment, an insulated conductive contact pin that forms part of a module retention system is employed to convey RF signals between the devices.

In a particular embodiment, the contact pin is ferrous such that it generates contact force through attraction to a conductively plated magnet holding the two devices together. The contact pin is free to deflect in the direction of thickness of the device. Further, it may be connected to a flex conductor which in turn connects to a printed circuit board (PCB) on the added module. The contact pin contacts the PCB of the base device by passing through a hole in the center of the magnet. In this embodiment, the magnet is ring shaped and experiences a magnetic attraction to a ring-shaped disc of steel on the other device. Both the plated magnet and the steel are electrically conductive, either because of the applied conductive plating or because of inherent conductivity in the material itself. This conductivity allows the magnet and steel disc to form a grounded channel between the two devices.

In this way, RF signals carried by the plated pin will pass between the two devices within a fully grounded shroud or channel. This shielded configuration acts as a transmission line which reduces the loss of signal during transfer between the two devices, while also making efficient use of certain structures already present in the device.

With this overview in mind, and turning now to a more detailed discussion in conjunction with the attached figures, the techniques of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used.

Figure 1:
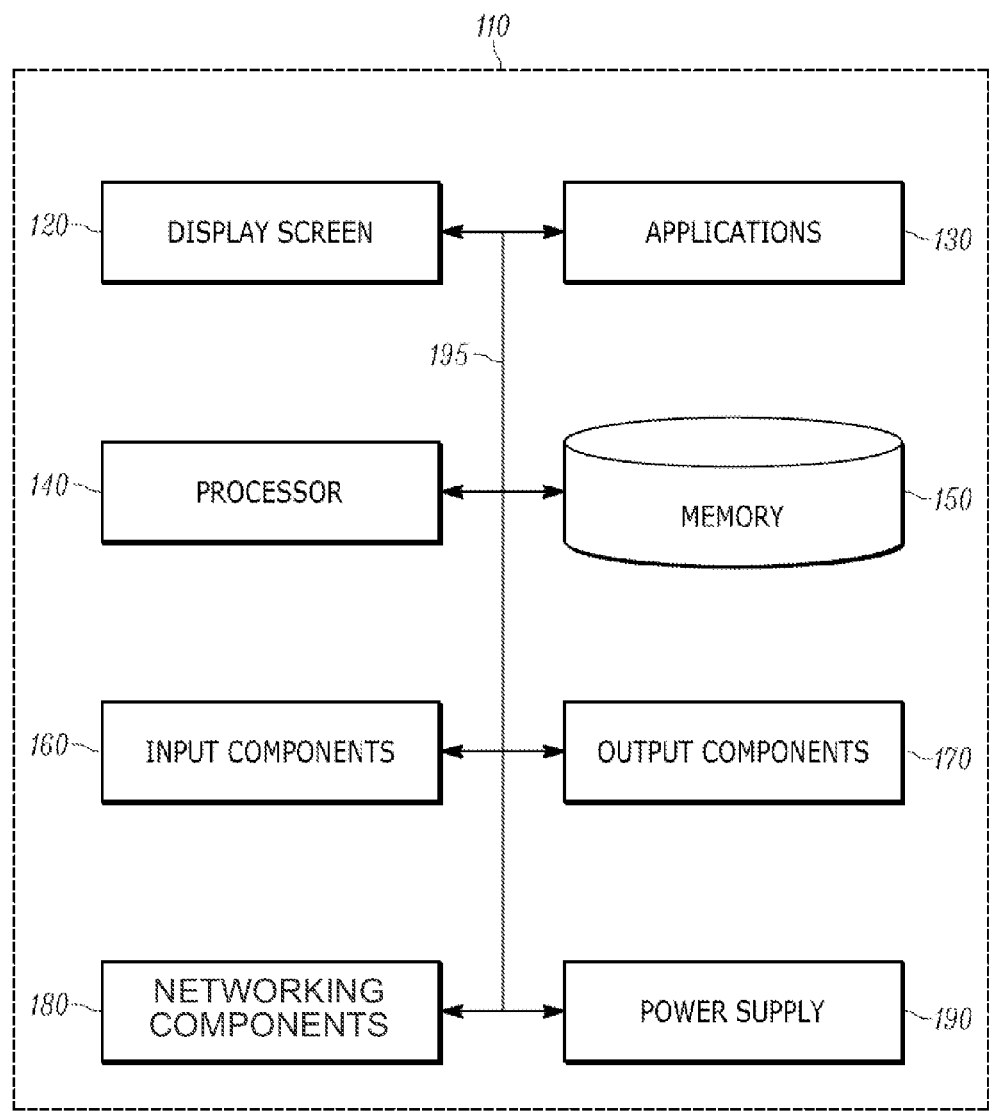
FIG. 1 is a simplified schematic of an example configuration of device components with respect to which embodiments of the presently disclosed principles may be implemented.

The schematic diagram of FIG. 1 shows an exemplary component group 110 forming part of an environment within which aspects of the present disclosure may be implemented. In particular, the component group 110 includes exemplary components that may be employed in a device corresponding to the first device and/or the second device. It will be appreciated that additional or alternative components may be used in a given implementation depending upon user preference, component availability, price point, and other considerations.

In the illustrated embodiment, the components 110 include a display screen 120, applications (e.g., programs) 130, a processor 140, a memory 150, one or more input components 160 such as speech and text input facilities, and one or more output components 170 such as text and audible output facilities, e.g., one or more speakers. The processor 140 may be any of a microprocessor, microcomputer, application-specific integrated circuit, or the like. For example, the processor 140 can be implemented by one or more microprocessors or controllers from any desired family or manufacturer.

Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device. Such functions may include, for example, interaction among various internal components and storage and retrieval of applications and data to and from the memory 150.

Further with respect to the applications 130, these typically utilize the operating system to provide more specific functionality, such as file system service and handling of protected and unprotected data stored in the memory 150. Although many applications provide standard or required functionality of the user device 110, some applications may provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

The device having component group 110 may include software and hardware networking components 180 to allow communications to and from the device. Such networking components 180 will typically provide wireless networking functionality, although wired networking may additionally or alternatively be supported.

In an embodiment, a power supply 190, such as a battery or fuel cell, may be included for providing power to the device and its components 110. All or some of the internal components 110 communicate with one another by way of one or more shared or dedicated internal communication links 195, such as an internal bus.

In an embodiment, the device 110 is programmed such that the processor 140 and memory 150 interact with the other components of the device 110 to perform certain functions. The processor 140 may include or implement various modules and execute programs for initiating different activities such as launching an application, transferring data, and toggling through various graphical user interface objects (e.g., toggling through various display icons that are linked to executable applications).

Figure 2:
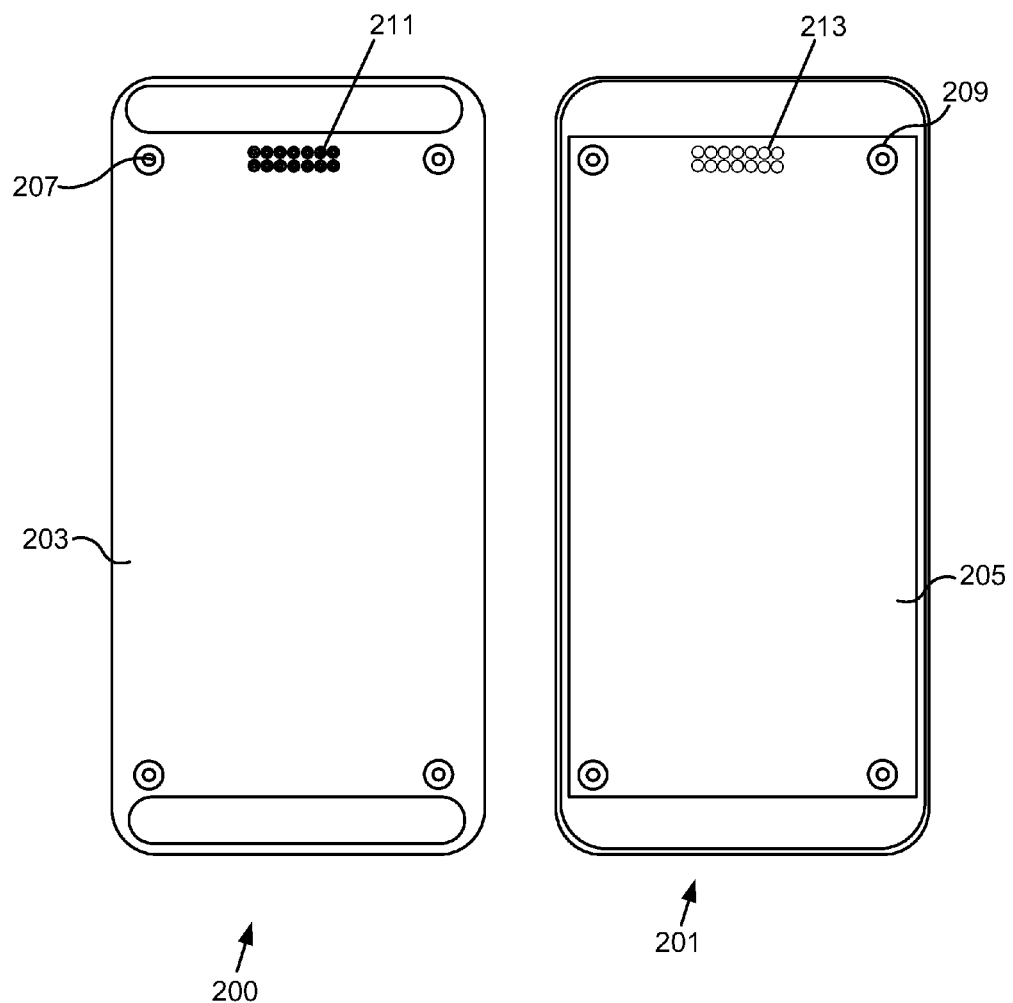
FIG. 2 is a back view of a first device and a second device, showing the backs of devices where they are configured for docking in accordance with an embodiment of the disclosed principles.

Turning to FIG. 2, this figure presents a view of the first device 200 and the second device 201, showing the back 203 of the first device 200 and the back 205 of the second device 201 in accordance with an embodiment of the disclosed principles. In the illustrated example, the back 203 of the first device 200 includes one or more conductively plated ferromagnetic alignment features 207, configured and placed to mate with mating magnetic features 209 on the back 205 of the second device 201. The mating features 209 in an embodiment are conductively plated magnets.

In addition, the back 203 of the first device 200 in the illustrated embodiment includes a connector array 211. The connector array 211 is located and configured to mate with a mating connector array 213 on the back 205 of the second device 201. One or both of the connector array 211 and the mating connector array 213 may be spring loaded for positive contact.

Figure 3:
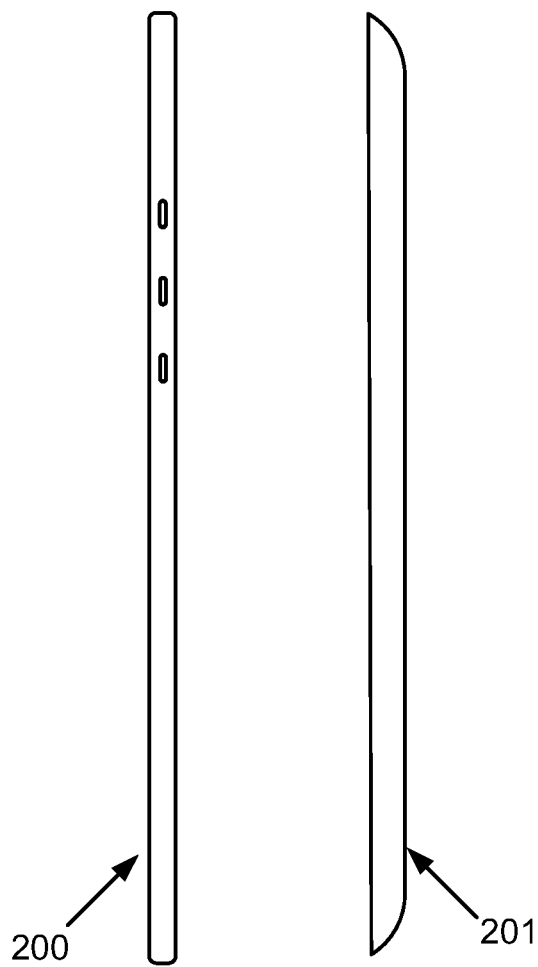
FIG. 3 is a side view of the first device and the second device of FIG. 2 while undocked from one another.
Figure 4:
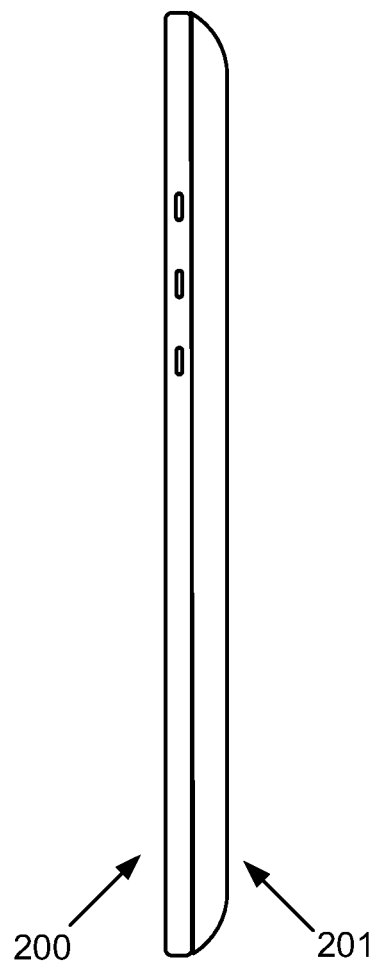
FIG. 4 is a side view of the first device and the second device docked together in accordance with an embodiment of the disclosed principles.

FIG. 3 shows a side view of the first device 200 and the second device 201, not yet mated (docked) together. Continuing, FIG. 4 illustrates a side view of the first device 200 and the second device 201 mated together at the backs 203, 205 of the first device 200 and second device 201 in accordance with an embodiment of the disclosed principles. As can be seen, the devices 200, 201 are in physical contact when mated, meaning the ferromagnetic alignment features 207 on the back 203 of the first device 200 are in a contacting relationship with the mating magnetic features 209 on the back 205 of the second device 201.

In should be noted that alternate embodiments of either device 200, 201 may vary significantly in thickness and shape from those shown. In addition, while the devices 200, 201 are illustrated as having matching outlines, this need not be the case in every embodiment.

Figure 5:
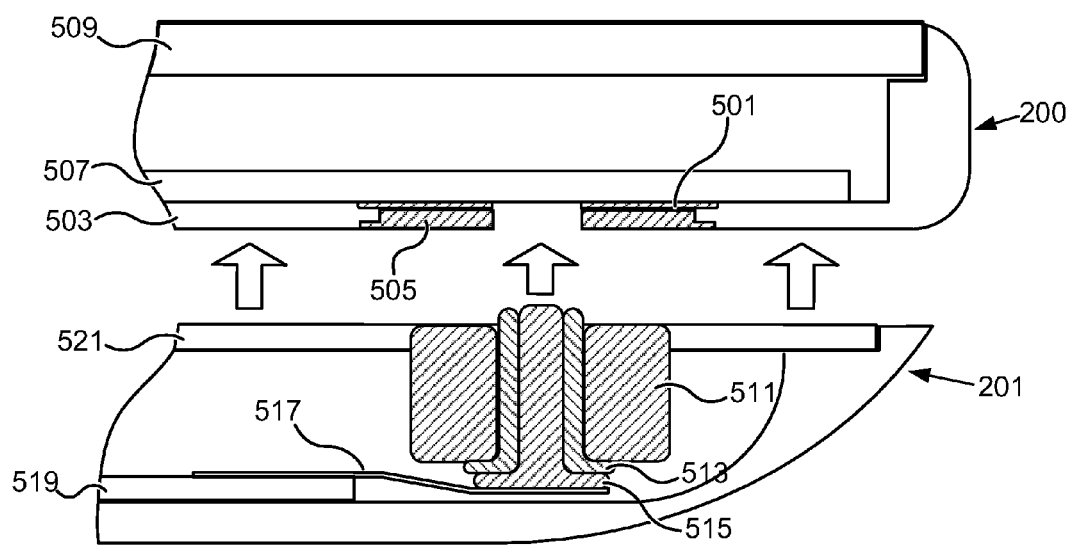
FIG. 5 is a cross-sectional side view of a magnetic retainer assembly including an RF pass through in accordance with an embodiment of the disclosed principles.

As discussed in overview above, an insulated plated magnetic contact pin that forms part of a module retention system is employed in an embodiment to convey RF signals between the devices 200, 201. FIG. 5 shows this feature in greater detail. In particular, FIG. 5 is a cross-sectional side view through a ferromagnetic alignment feature on the back of the first device 200 and the mated magnetic feature on the back of the second device 201. In the illustrated configuration, the second device 201 is dockable to the back of the base device 200 by moving the device 201 as indicated by the upward arrows.

In an embodiment, the ferromagnetic alignment feature on the back of the first device 200 includes a steel or other ferromagnetic annulus 505, which may be plated as noted above, grounded to a metallic housing 503 of the device 200. It will be appreciated that the ferromagnetic annulus 505 may instead be grounded to another structure. A non-magnetic annulus 501 is disposed under the ferromagnetic annulus 505. The openings in the ferromagnetic annulus 505 and the non-magnetic annulus 501 expose a contact surface on the PCB 507 of the first device 200. Although not important to the disclosed principles, a display assembly 509 is shown overlaying the front of the first device 200 in order to orient the reader.

The mating magnetic features on the back of the second device 201 include an annular magnet 511 grounded to the device back plate 521. Again, as noted above, the magnet 511 may be made conductive via application of an electrically conductive plating, e.g., of nickel, gold, silver, copper or otherwise. In an embodiment, the annular magnet 511 is not grounded when the devices 200, 201 are separated, but is grounded through the ferromagnetic annulus 505 when the devices 200, 201 are mated together.

An insulating sleeve 513 is disposed within the central opening in the annular magnet 511, and a plated ferrous pin 515 is in turn disposed within the insulating sleeve 513. The insulating sleeve 513 prevents the plated pin 515 from shorting to the grounded magnet 511. A flexible printed circuit 517 links the plated pin 515 to the PCB 519 of the device 201.

Figure 6:
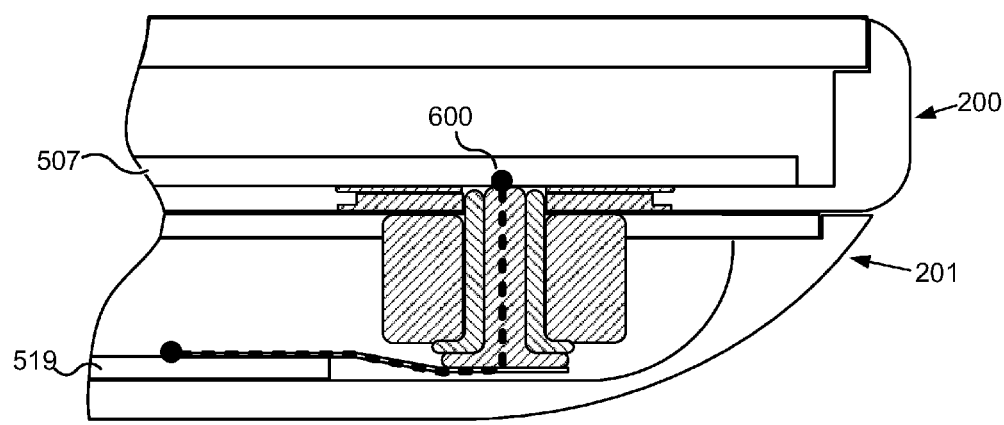
FIG. 6 is a cross-sectional side view of the devices of FIG. 5, wherein the devices are docked together in accordance with an embodiment of the disclosed principles.

In this way, when the second device 201 is docked to the first device 200 as shown in FIG. 6, the plated pin 515 forms an insulated shielded pathway 600 from the PCB 507 of the first device 200 to the PCB 519 of the second device 201. The grounded magnet 511 shorts to the ferromagnetic annulus 505 in the docked position since both are conductive, shielding the pathway 600. The conductive path of the connection 600 is shown via the heavy dashed line drawn through the plated pin 515 in the figure. The grounded shield formed by the magnet and ferromagnetic annulus 505 reduces loss of signal during transfer of RF signals between the two devices 200, 201 while efficiently making use of a retention structure already required in the device for other purposes.

In particular, in the docked configuration, the attraction between the magnet 511 and the ferromagnetic annulus 505 assists in holding the devices 200, 201 in the docked configuration. In an embodiment, the devices 200, 201 employ multiple such retention pairs, e.g., one at each corner of each device 200, 201. In an implementation using multiple pairs, any number of the pairs may also provide redundant conductive pathways such as path 600 shown in FIG. 6.

While the first device 200 will typically include RF transmission and receipt functionality and elements independently of the second device 201, the ability to pass RF signals between the devices 200, 201 is nonetheless useful in many situations. For example, in an embodiment, the second device 201 is constructed such that it omits antennas and similar RF transmission and receipt facilities. This may be done to provide a more compact module, to reduce device cost, or for other reasons. In this situation, the second device 201 passes RF signals to the first device 200 for transmission and receives any incoming RF signals in the same manner.

In another embodiment, the second device 201 includes antennas and similar RF transmission and receipt facilities, and when docked to the first device 200, the second device 201 negatively impacts the ability of the first device 200 to send and receive RF transmissions. In this case, the first device 200 is able to use the second device 201 to send and receive such signals. These examples are illustrative only, and it will be appreciated that there are many other situations in which passing RF signals between a base device and a docked device is beneficial.

Although the shielded channel is suitable for RF signal conduction, it will be appreciated by those of skill in the art that the shield channel may also be used for the conduction of signals in other frequency ranges, including DC signals. In addition, non-signal electrical conduction is also supported in an embodiment, e.g., for power transmission between the devices.

It will be appreciated that systems and methods for transferring RF signals between devices in a modular portable device environment have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A modular portable device system comprising:
    two portable electronic devices;
    at least one magnetic attachment point on a first one of the portable devices comprising an annular magnet having a central opening therein, an electrically conductive pin extending through the central opening and an electrically insulating layer insulating the electrically conductive pin from the annular magnet; and
    at least one corresponding magnetically responsive attachment point on a second one of the portable devices comprising a conductive ferromagnetic annulus configured and located such that when the first and second devices placed together, they are pulled together by magnetic attraction between the annular magnet and the ferromagnetic annulus, and the electrically conductive pin and electrically insulating layer further extend through the ferromagnetic annulus forming a shielded electrically conductive pathway between the devices.

2. The modular portable device system in accordance with claim 1, wherein the annular magnet is grounded to a conductive housing of the first device.

3. The modular portable device system in accordance with claim 1, wherein the ferromagnetic annulus is grounded to a conductive housing of the second device.

4. The modular portable device system in accordance with claim 1, wherein the electrically conductive pin is connected to a printed circuit board (PCB) of the second device when the two devices are attached together.

5. The modular portable device system in accordance with claim 1, wherein the electrically conductive pin is connected to a flexible printed circuit of the first device.

6. The modular portable device system in accordance with claim 1, wherein the electrically conductive pin is constructed of a ferromagnetic material.

7. The modular portable device system in accordance with claim 6, wherein the electrically conductive pin exerts a contact force against the PCB of the second device when the two devices are attached together due to magnetic attraction between the annular magnet and the electrically conductive pin.

8. The modular portable device system in accordance with claim 1, wherein the ferromagnetic annulus is constructed of steel.

9. The modular portable device system in accordance with claim 1, wherein the at least one magnetic attachment point on the first portable device includes two magnetic attachment points having annular magnets, with only one of the two magnetic attachment points including an electrically conductive pin extending through the respective annular magnet.

10. The modular portable device system in accordance with claim 1, wherein the at least one magnetic attachment point on the first portable device includes two magnetic attachment points having annular magnets, and wherein both magnetic attachment points include an electrically conductive pin extending through the respective annular magnet.

11. A portable device having a modular connection system comprising:
- a device housing;
- an annular magnet having a central opening therein;
- an electrically conductive pin extending through the central opening and out of the device housing for contacting another device; and
- an electrically insulating layer insulating the electrically conductive pin from the annular magnet so that the electrically conductive pin forms a shielded electrically conductive pathway out of the device,
- wherein the annular magnet comprises two annular magnets having respective central openings, and wherein the electrically conductive pin includes only a single pin extending through the central opening of one of the annular magnets.

12. The portable device in accordance with claim 11, wherein the annular magnet is conductive due to one of inherent conductivity and conductive plating and is grounded to the housing of the device.

13. The portable device in accordance with claim 11, wherein the electrically conductive pin and electrically insulating layer extend sufficiently outside the housing of the device to pass through an opening in a housing of another device.

14. The portable device in accordance with claim 11, wherein the electrically conductive pin is connected to a flexible printed circuit of the device.

15. The portable device in accordance with claim 11, wherein the electrically conductive pin is constructed of a ferromagnetic material.

16. The portable device in accordance with claim 15, wherein the electrically conductive pin is magnetically attracted to the annular magnet.

17. The portable device in accordance with claim 11, wherein the grounded annular magnet comprises two annular magnets having respective central openings, and wherein the electrically conductive pin includes two pins extending through the central opening of each of the annular magnets.

18. A modular portable device connector system comprising:
- an annular magnet having a central opening therein;
- an electrically conductive pin extending through the central opening;
- an electrically insulating layer insulating the electrically conductive pin from the annular magnet;
- a magnetically responsive attachment point for attachment to the annular magnet, the magnetically responsive attachment point including a conductive ferromagnetic annulus configured to attach to the grounded annular magnet by magnetic attraction such that the electrically conductive pin and electrically insulating layer further extend through the ferromagnetic annulus forming a shielded electrically conductive pathway.

19. The modular portable device connector system in accordance with claim 18, wherein the electrically conductive pin is constructed of a ferromagnetic material and is magnetically attracted to the annular magnet.

* * * * *